(No Model.)
R. M. JOHNSON.
Thill Coupling.
No. 238,124. Patented Feb. 22, 1881.
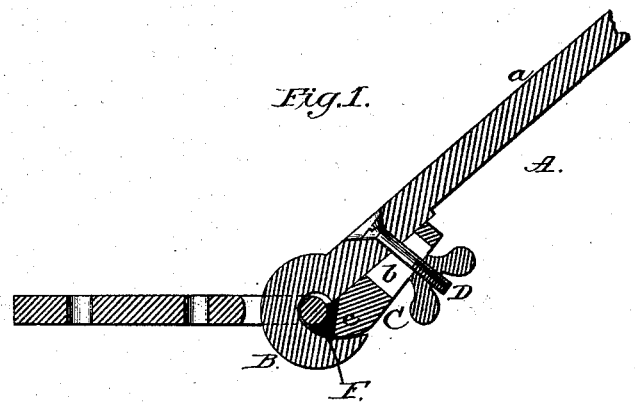
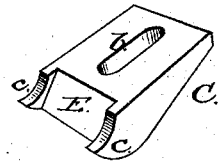
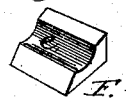
WITNESSES
John A. Ellis.
Philip E. Masi.
INVENTOR
R. M. Johnson
by Anderson & Smith
his ATTORNEYS

UNITED STATES PATENT OFFICE.

RICHARD M. JOHNSON, OF EAST TROY, PENNSYLVANIA.

THILL-COUPLING.

SPECIFICATION forming part of Letters Patent No. 238,124, dated February 22, 1881.

Application filed January 8, 1881. (No model.)

*To all whom it may concern:*

Be it known that I, RICHARD M. JOHNSON, a citizen of the United States, resident at East Troy, in the county of Bradford and State of Pennsylvania, have invented certain new and useful Improvements in Thill-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1 is a longitudinal section. Figs. 2 and 3 are details.

This invention relates to thill-couplings.

The invention consists in the construction hereinafter described, and particularly pointed out in the claim.

In the drawings hereto annexed, A is the thill-iron, to be attached to the thill by the stem or tang $a$. B is the hooked end, formed substantially as shown. This iron is attached to the thill with the hook down.

To attach the thills or pole to a wagon or other vehicle, the hooks B are caught over the ordinary thill-bolt; or a loop having a bar corresponding to the coupling-bolt in front may be used.

C is a wedge, having the lip $c$ and slot $b$. This is to be slipped in place under the hook after the latter catches the bolt, and a set-screw, D, is run through slot $b$ into iron A, and binds the wedge to the iron and keeps the thill from becoming loose.

An anti-rattler may be used with this coupling, the one shown being a good one.

E is a notch cut in the face of wedge C, and in said notch is seated a piece of rubber, F, fitting said notch snug, and having a face, $e$, to correspond with the bolt.

With this device there need only be a change of irons to suit any of the old style of vehicle, the hook readily suiting any of the clips now in use.

A slotted wedge having an upwardly-projecting shoulder rectangular in form is not broadly new, and protection is only desired for the construction claimed hereinafter.

What I claim is—

In a thill-coupling, the wedge C, having slot $b$, recess E, and ears $cc$, concaved in their edges, as shown, in combination with the thill-iron A, having hook B, bolt and thumb-screw D, rubber block $e$ F, and the clip and clip-bolt, substantially as and for the purposes set forth.

In testimony whereof I affix my signature in presence of two witnesses.

RICHARD M. JOHNSON.

Witnesses:
 GEO. L. HICKS,
 J. H. DEXTER.